United States Patent [19]

Kobeski et al.

[11] 4,076,862

[45] Feb. 28, 1978

[54] METHOD OF TREATING EARTHEN AREAS

[75] Inventors: Walter Dan Kobeski, Milton, W. Va.; Sigismund Walter Srocki, Streamwood; William Ivan Blosser, Wheeling, both of Ill.; James Joseph Needham, Marietta, Ga.

[73] Assignee: United States Gypsum Company, Chicago, Ill.

[21] Appl. No.: 602,869

[22] Filed: Aug. 7, 1975

Related U.S. Application Data

[63] Continuation of Ser. No. 408,034, Oct. 19, 1973, abandoned.

[51] Int. Cl.$^2$ .............................................. B05C 1/16
[52] U.S. Cl. .................................... 427/136; 106/111; 106/118; 169/45; 169/64; 252/2; 427/427
[58] Field of Search ................. 427/136, 427; 428/341; 47/58; 106/111, 118; 169/45, 46, 64; 252/2, 3, 8.05

[56] References Cited

U.S. PATENT DOCUMENTS

| | | | |
|---|---|---|---|
| 1,451,485 | 4/1923 | Wootton | 252/8.1 |
| 1,813,367 | 7/1931 | Thompson | 169/46 |
| 1,882,911 | 10/1932 | Richards | 169/45 |
| 1,995,963 | 3/1935 | Croce | 106/111 |
| 2,910,396 | 10/1959 | Randall et al. | 427/372 |
| 2,924,279 | 2/1960 | Hofbauer et al. | 169/45 |
| 2,980,548 | 4/1961 | Hampton | 106/118 |
| 3,328,121 | 6/1967 | Shull | 106/118 |
| 3,367,863 | 2/1968 | Cooper et al. | 252/2 |
| 3,414,462 | 12/1968 | Cafferata | 106/118 |
| 3,600,852 | 8/1971 | Burke et al. | 47/58 |
| 3,793,841 | 2/1974 | Dozsa | 106/118 |

*Primary Examiner*—Ronald H. Smith
*Assistant Examiner*—Sadie L. Childs
*Attorney, Agent, or Firm*—Kenneth E. Roberts; Robert H. Robinson; Samuel Kurlandsky

[57] ABSTRACT

A method of treating barren earthen areas for inhibiting air and sun spoilation is disclosed, the method comprising forming an aqueous slurry of calcium sulfate hemihydrate with a small amount of defoamer using a quantity of water about 25–56% above normal consistency, the hemihydrate particles having a surface area of about 4,000–16,000 square centimeters per gram; and spraying the slurry onto the barren area to form a set, substantially air-impermeable covering to the barren area that will substantially exclude outside air from the area. The method is particularly applicable to controlling burning coal spoils and inhibiting spontaneous combustion of coal refuse banks.

12 Claims, No Drawings

METHOD OF TREATING EARTHEN AREAS

This is a continuation, of application Ser. No. 408,034, filed Oct. 19, 1973 and now abandoned.

BACKGROUND OF THE INVENTION

This invention relates to treating barren earthen areas for inhibition of air and sun spoilation, and more particularly it relates in one preferred embodiment to preventing fires in combustible earthen banks such as burning coal refuse piles and inactive coal refuse banks and the like.

In one specific area of application, namely burning or combustible coal spoil piles and other combustible mine refuse dumps, the uncontrolled burning of such dumps has created a severe pollution and environmental control problem in many places. In 1964 the United Staes Bureau of Mines estimated that there were then almost 500 burning coal refuse banks averaging 14 acres per bank. More recently the situation has become worse. As defined by the Bureau of Mines, refuse banks are to be considered as any combination of carbonaceous waste and materials associated with rock, shale, culm, boney, slate, clay and related material associated with or near a coal seam which are removed from the mine or separated from the coal during the cleaning or preparation operations. Such earthen refuse is deposited in a pile to form a bank. The banks are loose on the surface, but as subsequent layers are added compaction takes place and heat is generated by atmospheric exposure. Many components of the bank are combustible; and with air permeating into the bank, spontaneous combustion occurs when air enters in sufficient quantities to support and promote combustion. When "hot spots" are detected, or the refuse banks begin to smolder and burn, men and equipment must be moved to the site of the fire and must break into the burning pocket within the bank. The "hot spot" must then be isolated and cut away from the bank or extinguished and the pocket then sealed, generally in practice, by covering with a minimum two-foot layer of compacted very finely divided inert material. Still, after such sealing measures, banks frequently reignite either by failure to completely cut out and isolate the complete "hot spot" or by the ignition of adjacent areas to the pocket previously extinguished. Such banks tend to be very large with steep slopes, and it is quite difficult and frequently hazardous to move men and equipment about them.

DESCRIPTION OF THE PRIOR ART

Many large waste coal banks in many locations have been burning and reigniting off and on over many years. A general method of attempting to control such fires is as set forth hereinabove. Other methods have been attempted including the pumping, pouring or spraying onto the burning surfaces of an expensive fire extinguishing agent such as that set forth in U.S. Pat. No. 3,367,863. That patent discloses the use of a chemical fire retardant which will put out the fire; and this and other common fireproofing chemical agents are very expensive to use when applied to extensive large waste coal piles and the like combustible earth spoils.

The use of men and heavy earth-moving equipment to dig out and isolate burning areas is dangerous, tedious and time-consuming. Further it is frequently only a temporary stop-gap measure and substantially ineffective over the long run. The use of chemical fire-extinguishing agents would be expensive and has not substantially been adopted by the workers in the art.

In an unrelated area of endeavor it is also known to treat soil surfaces with a composition containing stucco and plant seeds for establishing plant growth in a soil surface and concurrently preventing erosion of the soil surface, such as disclosed in U.S. Pat. No. 3,600,852. Such method is satisfactory where air permeability can be tolerated and in cooled soil surfaces. However, such method is not satisfactory where burning is ongoing, as in the areas of interest here, as the soil surface is subject to spontaneous combustion or where the soil surface has such contained heat that while vegetative growth may be established it cannot be maintained for more than a short period of time. Generally these earthen areas are dark in color so they absorb and retain great quantities of heat from exposure to the sun. Some may never, due to sun exposure, sufficiently cool to support vegetation. Thus a need exists to cool such hot barren areas and protect them from sun spoilation sufficiently that subsequently they may be seeded and plant growth established and maintained.

SUMMARY OF THE INVENTION

It is therefore an object and advantage of the present invention to provide an effective and comparatively inexpensive method for treating barren earthen areas subject to air and sun spoilation.

Another object and advantage is the provision of a method of treating barren earthen areas subject to air spoilation by providing a mechanical barrier to air flow thus effectively halting combustion and controlling and preventing reignition of combustible earthen spoils.

Still another object is the provision of a method for treating barren earthen areas subject to air spoilation without the addition of exotic and expensive chemical fire-extinguishing agents.

A further object is the provision of a method for effectively treating burning coal refuse piles and other burning ore spoils.

A still further object is the provision of a method of treating inactive coal refuse banks and other mine tracts susceptible to spontaneous combustion.

A still further object is the provision of a method of treating barren earthen areas, which by air and sun spoilation contain sufficient generated heat to prevent the growth of vegetation thereon, in a manner which will allow the subsequent establishment and continued growth of vegetation.

The fulfillment of the above and other objects and advantages of the present invention are accomplished by the steps of forming a sprayable aqueous slurry of calcium sulfate hemihydrate and a minor amount of a defoamer, the hemihydrate particles having a surface area of about 4,000 to about 16,000 inclusively square centimeters per gram, the water being present in an amount of about 25–56% by volume above normal consistency for that hemihydrate; applying the slurry to the surface of the barren area to be treated; and allowing the applied slurry to set whereby there is formed a set, substantially air-impermeable, dense layer of gypsum, at least on the order of about one-eighth inch in thickness, so as to substantially exclude atmospheric air and reflect radiant sun heat from the surface of the treated barren area. In repeat subsequent maintenance applications only about 1/16 inch thick layers need be applied to provide effective protection. In initial applications in extreme cases a thickness up to about one inch may be desired. It is found that the present method surprisingly provides a hard, dense crust over the barren earthen areas so as to sufficiently exclude atmospheric air as to extinguish burning, and over long periods of time effectively prevent reignition of combustible earthen spoils. It was further surprisingly found that the method dramatically cooled barren earthen areas which are not necessarily subject to combustion but which, because of their composition and light-absorbing properties, were so hot due to absorbed heat from the sun that the continued growth of vegetation on them was virtually impossible. Such cooling was as much as 23% and such cooled condition continued sufficiently long as to not only establish but also maintain vegetative growth upon such earthen areas. Thus, in one instance, noncombustible hot slag piles upon which the growth of vegetation could not be maintained could be treated by the above method, and this treatment could be followed by a subsequent separate treatment of a stucco composition containing plant seeds so as to by the first treatment cool the earthen mass and by the second different treatment establish and subsequently maintain vegetative growth.

DESCRIPTION OF THE PREFERRED EMBODIMENTS

By the terms "barren earthen areas subject to air and/or sun spoilation" are meant to include such things as burning coal refuse banks and other combustible ore spoils; inactive coal refuse banks and other mine tracts susceptible to spontaneous combustion; garbage and refuse dumps and the like susceptible to combustion; manufacturing and processing plant stockpiles of coal and other combustible ore and minerals spoilable by heat and air permeation; and earth, earthen, ore, and mineral refuse and stockpiles, such as slag piles, which by their nature and constituency and generally also because of their dark coloration, contain or absorb from exposure to the sun, sufficient heat as to prevent the establishment and maintenance of vegetation thereon. Even highway embankments in certain areas of the world because of their composition and exposure to sunlight can generate or contain sufficient heat as to fall in the above categories. Further the air and sun spoilation need not go to the extent of reaching the point of combustion, as there is considerable sun and air spoilation evidenced by decay of organic matter and loss of somewhat volatile constituents such as, for example, in methane emissions from coal gob piles and the like.

The principal ingredient of the aqueous slurry is calcium sulfate hemihydrate, commonly known as gypsum plaster or stucco. The hemihydrate material may be present in its beta form, commonly called plaster of Paris, or its alpha form, commonly called alpha gypsum, or blends of these two forms. Whether the alpha form is used or the beta form is used will somewhat affect the amount of water to be included in forming the aqueous slurry of the present invention since the alpha form and the beta form have different water requirements for obtaining a normal consistency. The alpha form will have a normal consistency of about 34 to about 42; and the beta form will have a normal consistency of about 60 to about 95. Blends of the two forms can provide normal consistencies between the above figures. This is important since primary considerations of the slurry in the present invention are to provide sufficient water for fluidity of the mass for pumping and spraying without water separation during these operations and yet provide optimum packing of the hemihydrate particles during setting and water-holding ability during setting of the aqueous slurry. Thus the sprayed aqueous slurry will be sufficiently fluid to flow around all particles on the surface being sprayed so as to seal them and on the other hand have optimum packing of the hemihydrate particles so as to set into a hard air-impermeable crust as to inhibit gas flow into and out of the barren area being treated. The important consideration is to provide a mechanical barrier to gas flow so as to extinguish burning, control and prevent reignition, and to reduce heat generation within the barren earthen area being treated.

By the term "normal consistency" is meant the minimum amount of water in cubic centimeters which is sufficient to form a pourable slurry from 100 grams of the gypsum hemihydrate material; and such term is one generally accepted in the art with regard to describing the amount of water in cubic centimeters to be added per 100 grams of hemihydrate material to form the aqueous slurry. The procedure for establishing normal consistency measurements for any particular hemihydrate material are set forth in the article "U.S.G. Methods of Testing Gypsum Cements and Plasters" by Robert Hamilton, pp. 68–71 and 93 of Ceramic Industry, Vol. 71, No. 1, July, 1958. The amount of water actually used is given as the percentage over and above the normal consistency, i.e., if the particular hemihydrate particles being used are determined to have a normal consistency of 40 cubic centimeters of water per 100 grams of gypsum; then a usage amount that corresponds to 25% above the normal consistency calculates to the use of about 64 cubic centimeters of water per 100 grams of that hemihydrate. Thus in the present specification it is generally desired to use on the order of about 25–56% above the normal consistency; and this converts to the use of about 50 to 100 cubic centimeters of water per 100 grams of hemihydrate for a particular hemihydrate that has a normal consistency of 64. Another way to state this for the same material is to use a water-to-gypsum ratio of 0.8–1 parts of water per 1 part by weight of gypsum. Generally the normal consistency of the beta calcium sulfate hemihydrate used will range on the order of 60 to 70. The use of alpha calcium sulfate will generally provide even denser and less air-impermeable crusts since the normal consistencies of that material when used will range in the order of 34–42.

The hemihydrate particles used should have a surface area of about 4,000–16,000 square centimeters per gram so that the particles when mixed with the proper amount of water will provide sufficient fluidity for pumping and spraying without water separation yet on the other hand provide sufficient packing and water-holding ability while setting so as to form an air-impermeable crust.

A minor amount of a defoamer is included in the formulation so as to scavenge air from the formulation during pumping and spraying. This is an important consideration to avoid air incorporation in the formulation being sprayed, since air would lessen the density of the setting slurry and increase the air permeability of the setting mass. Any customary defoamer known to the industry may be used and particularly preferred ones include tributyl phosphate, a defoamer known as NOPCO PD-1 which is an oily ester absorbed on diatomaceous earth, and the like. The amount of defoamer to be included in the formulation is highly variable depending upon the particular one used and the amount of agitation to be encountered in pumping and spraying which varies with the various equipment available; however, it is generally preferred to use an amount varying from about ½ pound to 5 pounds per ton of hemihydrate, and particularly ½ to 2 pounds is specifically preferred, of the tributyl phosphate; and about 1 pound to 5 pounds per ton of hemihydrate of the NOPCO PD-1 defoamer. Substantially more or less may be used, but without further substantial advantage.

It has generally been found that, for initial treatment, the sprayed slurry should be applied to form a layer on the barren area of about ⅛ inch to about ⅜ inch thick; and such will substantially exclude air permeation and accomplish the objectives and advantages of the present invention. In repeat subsequent maintenance applications about 1/16 inch thick layers will provide effective protection. In initial applications in extreme cases a thickness up to about one inch may be desired.

In some instances it is preferred to include various amounts of lime, either quicklime or hydrated lime, in amounts up to about 33% by weight of the aqueous slurry. The inclusion of lime aids in water resistance of the applied layer by carbonation of the hydrated lime providing a more impervious surface to the layer. Further inclusion of lime would improve and aid in the handling of the aqueous slurry as by hindering settlement of the plaster particularly in rather thin mixes, while aiding in fluidizing and pumping of the mix. In addition lime adds alkalinity to assist in neutralizing high acid wastes.

In instances where the barren area is relatively smooth and uniform, spraying readily covers all interstices of the surface. Where the barren area is composed of coarse particles or is very eroded, it is optionally beneficial to include some fibers in the formulation to provide a matting effect, aiding in bridging the interstices between particles. Any fibrous material may be used including vegetative fibers such as wood fiber or paper fiber and inorganic fibers such as glass fiber or mineral wool fibers. The amount of fiber to be included varies widely and may be up to about 15% by weight of the hemihydrate. Somewhat more may be used, but without substantial further advantages.

EXAMPLES

The following specific examples will serve further to illustrate the practice of the present invention. Normal consistencies were determined using the method set forth in Ceramic Industry, Vol. 71, No. 1, July, 1958.

EXAMPLE 1

A 2500-gallon capacity mixing tank equipped with agitator blades and a slurry pump was charged with approximately 1400 gallons of water (11,470 pounds). The tank was equipped with twin mixing shafts with paddle-type blades located in the bottom third portion of the tank so as to provide vigorous agitation. With agitation, 7 tons (14,000 pounds) of beta calcium sulfate hemihydrate that had a normal consistency of 62-68 and was ground to a surface area of about 7000-8000 square centimeters per gram; sufficient retarder to obtain a 5-7 hour set; and 4 ounces of set stabilizer were added into the tank. Approximately 21 pounds of NOPCO PD-1 defoamer were added into the tank to control foaming of the slurry and foaming during spraying. Slurry appearance was fluid and creamy. The mixed slurry was discharged through a gravity-fed sump pump, at the bottom rear section of the tank, to the centrifugal pump, feeding a fire hose type nozzle, portion of a Finn HYDRO-SEEDER manufactured by the Finn Equipment Company of Cincinnati, Ohio. The pressure developed by the centrifugal pump was such that the slurry could be sprayed over 150 feet in distance; and by changing the nozzle type a fogging spray was produced for close-up spraying. It required approximately 9-10 minutes to fully empty the tank of its total 25,470 pounds of mixed material. Inspection of the tank showed no sediment lying in the bottom of the tank.

The formulation was sprayed over a portion of a burning coal refuse bank in size of approximately 7 acres and having regular heights up to about a hundred feet. The portion to be sprayed had a number of burning hot spots in it at the time of spray application. The formulation was sprayed on one side of the burning bank where external flames were visible. It was apparent within a few hours that the fire had ceased in the sprayed area.

After application of the materials, it was observed that the thin layer, approximately ⅜ inch, provided a continuous and uniform coating to smother and control the spontaneous combustion occurring in the refuse bank. After 16 weeks or 4 months no new fires had broken out on the sprayed portion of the bank; and observation impressively showed that a thin layer of the material provided a continuous and uniform coating to smother and control the spontaneous combustion previously occurring in that coal refuse pile. Every two to three weeks therafter to date, small areas, less than 10% of the total sprayed area, have been recoated with ⅜ inch layers as a maintenance type operation due to continuous settling of the bank and development of cracks as the fires ebbed. Respraying has kept air out to prevent reignition of the still hot interior mass.

Using the same equipment, procedures and ingredients a second formulation was prepared that differed only in that the hemihydrate was of the alpha form, had a normal consistency of 42 and was ground to about 3800-4000 square centimeters per gram; and less water was added because of the lower consistency (but within the range of 25-56% above normal consistency for that hemihydrate). The material pumped and sprayed readily, without settling of hemihydrate in the mixing tank or separation of water during spraying; and without evident foaming during mixing, spraying or setting; to provide an even denser set crust which would more effectively cut off gas flow Every two to three weeks thereafter to date, small areas, less than 10% of the total sprayed area, have been recoated with ⅜ inch layers as a maintenance type operation due to continuous settling of the bank and development of cracks as the fire ebbed. Respraying has kept air out to prevent reignition of the still hot interior mass.

A third formulation was made and applied using the same equipment and procedures with a gauging plaster hemihydrate ground to about 3500 square centimeters per gram and containing about 2% of greater than 50 mesh particles. Mixing of the formulation was incomplete due to the proportion of very coarse particles which were slow wetting. Also, after spraying had been completed, a lot of residual hemihydrate remained in the mixing tank.

EXAMPLE 2

To the third formulation of Example 1 was added an amount of hydrated lime equal to 1-7% by weight per ton of hemihydrate. Also a coarser hemihydrate was used, being approximately 5000 square centimeters per gram. The formulation was sprayed as set forth in Example 1. It was observed that the lime addition aided in bodying up the coarser hemihydrate material during mixing and assisted in holding the coarse hemihydrate particles in suspension during pumping and spraying; and also assisted in preventing settling out of the slurry during mixing, pumping and spraying. It was believed that the hydrated lime would assist in controlling pH in the root area and would increase the weatherability of the applied gypsum layer.

EXAMPLE 3

A slag refuse pile containing primarily shale rock, clay and some coal by-product of a coal mine processing plant was located. The particular refuse pile had been built as to form a dam which holds back a refuse slurry settling pond; the dam being nearly completed, the slope having been graded to reduce the surface of the spoil bank to a reasonably closed texture resembling rocky soil. The angle of repose of the base one-half of the slope was approximately 44°; and the angle of repose of the top one-half of the slope of the refuse pile was approximately 24°.

Prior to this testing, several previous attempts had been made to start plant life on similar refuse piles, using various different methods to establish plant life. One of those methods attempted was to apply various water-porous and air-permeable slurries of various mulches and plant seeds. It was stated that while the plant seed germinated and for a time grew well under those methods, the plant seed eventually burned out leaving virtually no trace of growth. It was believed that the early burn-out of grass seeds was caused by excessive surface temperatures.

Using a HYDRO-SEEDER equipped with a 1300 gallon mixing tank and approximately 700 feet of 1½ inch hose for spraying, beta calcium sulfate hemihydrate having a surface area of about 4000 square centimeters per gram, a paper mulch, a mixture of plant seeds and water were mixed in the mixing tank in the following proportions:

- 2500 lb. hemihydrate (including 3 lb./ton of NOPCO PD-1 defoamer);
- 300 lb. paper mulch;
- 20 lb. of mixed grassy and legume plant seeds: black locust tree seeds; siricia Lespediza (legume); birds foot trefoil (quick-germinating ground cover on acid soils); perennial rye grass (quick-growing ground cover); Kentucky 31 fescue (grass seed); and
- 1200 gallons of water.

These ingredients were added to the mixing tank over a 20-minute period with a mixing time following addition of all ingredients of 10 minutes. Application of one charge of the above formulation onto the slope of the refuse pile was accomplished in approximately 6 minutes time when spraying directly from the HYDRO-SEEDER. In addition, the formulation was pumped from the HYDRO-SEEDER through 1100 feet of 1½ inch inside diameter hose for spraying more distant areas up and down the slope.

Over a three-day period, seven mixes per day were applied to different areas of the slope, each mix covering approximately ¾ of an acre. This resulted in most areas of the slope receiving a coverage of about 1½ to 2 tons of the formulation per acre to provide a surface crust of about 1/16 inch thick. In all instances, the formulation sprayed easily and well to cover varying distances from approximately 30 feet to close to 200 feet from the nozzle; and the sprayed slurry set to a hard crust in about 3½ hours.

The top north portion of the dam, having a slope of approximately 24°, received two sprayings to seal the surface with about ⅛ inch of the formulation and provide sealing the surface with a crust of about ⅛ inch thickness. After 6–8 weeks it was observed that the surface was still uniformly coated with about ⅛ inch formulation. No serious erosion features were noticed in this area, and this area held the slope surface fairly intact against heavy rain effects occurring during the time period. Growth was noted in all areas, and this area showed the most satisfactory concentration of seed growth. Four of the five varieties of seed used were identifiable as having germinated. It was observed that the seeding had been done during a time of year when conditions for germination and seed growth were not the best, yet optimism was expressed that the growth would continue well into the fall and winter. All of this double sprayed area, after 3 months during which there were severe rains, still had an effective sealing of the surface. Germination appeared heavy due to the great proportion of seeds retained. A nutritional deficiency was noted in vegetation growth which was corrected by an application of fertilizer about 2 months after spraying.

Over ½ of the total 30 acre slope was sprayed with about 1½ tons of the formulation per acre to provide a set layer sealing the surface with about 1/16 inch of the formulation. This included areas on both the upper slope where the angle of repose is approximately 24° and most of the lower slope where the angle of repose is approximately 44°. After 4–6 weeks these areas were observed. It was noted that where shading had occurred, shade aided significantly to seed growth, the shade occurring from trees in the area and also occurring from refuse, such as footprints and in crevices, increased seed growth was apparent. The seed growth had lasted for at least 4–6 weeks and it was being maintained without any significant early burn-off or bare spots occurring. No serious erosion features were noted, although in some of the steeper slope areas some erosion effects, from moderate towards severe, were observed. Four of the five varieties of seed used in the formulation were identifiable as having germinated. After 6–8 weeks, at the bottom of the slope, serious erosion occurred where rain runoff water occurred creating gulleys in the slope and washing of the formulation into a ravine. It was believed that had this area been covered to about ⅜–⅝ inch layer, the erosion would have been reduced significantly.

In a direct comparison, at the time of spraying the above formulation there was a comparative spraying of only a mixture of seed and fertilizer on a strip of the slope passing from the base to the top of the slope. After 4–6 weeks, very pronounced erosion effects were noted. There was seed growth in this area; however, rain run-off water occurred creating gulleys in the slope and washing seed into a ravine at the bottom of the slag pile.

After about 8–9 weeks the slag pile was again observed. The top portion of the pile, having the lesser slope, evidences very little erosion. At the bottom portion of the pile, the area having the steeper slope and the thinner crust was showing some erosion across the entire area, but the most severe erosion was on the strip treated with seeds and fertilizer only. Uniformly, the vegetation was beginning to show indications of a lack of nutrition because of slow growth and coloring deficiencies; however, growth continued. At that time fertilizer was applied onto the area to aid in sustaining and maintaining further growth in the vegetation period. After a total of three months from initial spraying, growth looked very good and the nutritional deficiency had been corrected.

It is believed that the cooler surface temperature maintained with the formulations of the present invention covering the slope will in the long run better establish vegetative growth. The slope surface temperatures were measured using glass thermometers at a number of different locations in both treated and untreated areas of the slope two days after spraying. Representative measurements are set forth in Table 1. In Table 1 measurements were taken at hourly intervals during the main sun exposure times of one day with an observation of the weather conditions at the time. The sprayed areas in which temperatures were taken were those from a section where the surface was uniformly coated with about a ⅛ inch layer of the hemihydrate formulation. From Table 1 it can be clearly observed that the sprayed formulation significantly lowered the surface temperatures of the soil, especially during the afternoon period of the day. It is expostulated that the Table 1
Temperatures of Slope

| Hour of the Day | Weather Conditions | Temperature | | |
|---|---|---|---|---|
| | | Air | Barren Areas | Sprayed Areas |
| 9 a.m. | heavily overcast | 70° F | 79° F | 72° F |
| 10 a.m. | cloudy | 78° F | 82° F | 77° F |
| 11 a.m. | clearing-partly cloudy | 79° F | 86° F | 77° F |
| 12 noon | mostly sunny | 85° F | 96° F | 82° F |
| 1 p.m. | cloudy to partly cloudy | 84° F | 97° F | 83° F |
| 2 p.m. | partly cloudy-hazy | 84° F | 104° F | 83° F |
| 3 p.m. | clearing-sunny | 84° F | 109° F | 87° F |
| 4 p.m. | sunny | 86° F | 117° F | 94° F | cooler surface temperatures maintained by the hemihydrate spraying will substantially prevent early burn-off of vegetation.

EXAMPLE 4

A refuse pile consisting mostly of shale, rock, slate, culm and related materials which are removed and separated from coal during cleaning and treatment operations was located. The coal refuse pile is located at the top of a mountain above the coal company treatment plant; the disposed material is somewhat weathered, showing signs of burning in some areas, and, although the slope is very steep — varying from about 30° to 45° and greater — the slope appears stable.

Approximately three one-acre plots were measured and staked out. After staking, each of the plots was sprayed with a fertilizer and water mixture to apply approximately 400 pounds of fertilizer to each acre. After fertilizing, one of the test plots was sprayed with a formulation in the following proportions:
  600 pounds of beta hemihydrate having a surface area of about
    4000 square centimeters per gram (and 3 lb./ton NOPCO PD-1);
  32 pounds of mixed seeds as follows:
    10 pounds annual rye grass
    8 pounds Japanese millet
    4 pounds birds foot trefoil
    5 pounds sericia Lespediza
    5 pounds black locust; and
  1200 gallons of water.

These materials were charged to a 2500 gallon tank attached to a Finn HYDRO-SEEDER over a 45-minute period. The formulation was then sprayed over a one-acre portion of the pile having a minimum slope of 44°, using 500 feet of 1½ inch hose onto the one-acre test plot over a period of about 30 minutes so as to coat the acre with a film thickness of about ⅛ inch. After 3 weeks, the area was revisited and it was observed that no erosion of the slope was evident; germination of the seeds was substantial and appeared to be very healthy.

Another one-acre test plot having a slope of 38°–44° was sprayed with the same formulation except that to the formulation was added 700 pounds of a wood-paper mulch. Spraying was in the same manner and it was noticed that spraying close to 200 feet in distances was possible. The tank was emptied in about 25 minutes. About three weeks after the application, the area was revisited and observed. No erosion was evident; germination of the seeds and growth was substantial and appeared to be very healthy.

A third one-acre test plot having a slope of about 30°–38° was sprayed using seed and the mulch only. That is, the mixing tank was charged with 700 pounds of a wood-paper mulch, 35 pounds of the mixed seeds and 2100 gallons of water. The wood-cellulose mulch swelled when added to the water, and thickened the mix, resulting in the required addition of approximately 700 additional gallons of water to dilute the mix for spraying fluidity. The formulation was sprayed in about 25 minutes. About three weeks after spraying the area was revisited and it was observed that in this area a considerable amount of washing off of the mulch was evident. Growth appeared to be substantial and appeared to be very healthy.

On the 11th and 12th days following spraying, temperature and relative humidity measurements were made of the three test plots plus at least one untreated area adjacent to the test plots using glass-mercury bulb thermometers with increments of ½ degree. The temperature at the surface of the slope area was taken. Also the air temperature and relative humidity measurements were taken, using a Barharach sling psychrometer at approximately 4 feet above the surface of the area being evaluated. All of the readings were taken when the sun was not behind a cloud. The temperature measurements (in degrees Fahrenheit) and percent relative humidity (abbreviated R.H.) are presented in Table 2. The prevailing weather conditions for the respective day are also set forth in Table 2. It was noted that following the 1:00 p.m. reading on the 12th day in the area treated with the hemihydrate formulation, that a cloud passed over the area shading the sun for five minutes. At that time the thermometer reading dropped from 104.9° F to 93.2° F. After the cloud had passed, the temperature reading returned to 104.9° F within four minutes and remained stable. From Table 2 it can be clearly seen that generally the air temperatures approximately 4 feet above the surface of the refuse did not vary greatly regardless of the treatment or nontreatment of the surface; however, at the surface the temperatures did vary greatly. It was observed that the combination of the hemihydrate formulation with the wood-paper mulch was not as white in color as the basic hemihydrate formulation itself, which probably accounts for the difference in surface temperature readings between these two different formulations.

While the present invention has been described and exemplified with respect to certain specific embodiments, it is not to be considered limited thereto; and it is to be understood that modifications and variations thereof, obvious to those skilled in the art, may be made without departing from the spirit or scope thereof. For example, in some instances it may be desired that minor proportions of customary calcium sulfate hemihydrate accelerators or retarders or mixtures thereof be present in order to vary the setting time of the slurry. It is desirable to adjust the setting time by the use of such materials so that the slurry does not begin to set up before it is sprayed and yet that it will set before it is adversely acted upon by the weather since precipitation may wash the setting layer off portions of the barren area and since very arid atmospheres may pull too much water out of the slurry before it has set.

Table 2

| Hour of the Day | Hemihydrate | Hemihydrate + Mulch | Mulch Alone | Untreated Area | Control* |
|---|---|---|---|---|---|
| Eleven Days After Spraying - Very Cloudy With Intermittent Rain | | | | | |
| 2:15 p.m. | 83.3° F | 82.4° F | 91.4° F | 89.6° F | 78° F 72% R.H. |
| 3:30 p.m. | 81.5° F | 82.4° F | 86° F | 90.5° F | 78° F 79% R.H. |

| Hour of The Day | Hemihydrate | Hemihydrate + Mulch | Mulch Alone | Untreated Areas #1 | #2 | Control* |
|---|---|---|---|---|---|---|
| Twelve Days After Spraying - Partly Cloudy - No Rain | | | | | | |
| 11:05 a.m. | | | | | | |
| air | 82° F | 84° F | 82° F | 82° F | — | 84° F |
| surface | 89.6° F | 95° F | 106° F | 113° F | — | — |
| Rel. humidity | 69% | 63% | 62% | 66% | — | 63% |
| 12:00 noon | | | | | | |
| air | 83° F | 81° F | 84° F | 87° F | 83° F | 80° F |
| surface | 93.2° F | 99.5° F | 108° F | 119.3° F | 115° F | — |
| Rel. humidity | 62% | 72% | 64% | 51% | 63% | 65% |
| 1:00 p.m. | | | | | | |
| air | 85° F | 82° F | 88° F | 85° F | 85° F | 82° F |
| surface | 104.9° F | 110.3° F | 137° F | 136.4° F | 127° F | — |
| Rel. humidity | 64% | 62% | 49% | 57% | 57% | 59% |
| 2:00 p.m. | | | | | | |
| air | 82° F | 82° F | 84° F | 87° F | 84° F | 84° F |
| surface | 98.6° F | 104° F | 125° F | 129.2° F | 116° F | — |
| Rel. humidity | 52% | 52% | 54% | 49% | 54% | 48% |

*Control constituted measurements of air temperature and relative humidity of a flat area adjacent to the slope.

What is claimed is:

1. A method of preventing combustion in combustible earthen banks which comprises the steps of:
   (1) forming a composition consisting essentially of an aqueous slurry of calcium sulfate hemihydrate and a minor amount of a defoamer, the hemihydrate particles having a surface area of about 4000 to about 16,000 square centimeters per gram with less than about 0.5% by weight of greater than 50 mesh particles, the water being present in an amount of about 25% by volume to about 56% by volume above normal consistency for the hemihydrate;
   (2) applying said composition to the surface of the area to be treated; and
   (3) allowing the applied composition to set whereby there is formed a dense, substantially air-impermeable and non-porous layer substantially inhibiting gas flow and radiant heat from the surface of the treated area.

2. The method of claim 1 in which the hemihydrate is an alpha calcium sulfate hemihydrate having a normal consistency of about 34-42 cubic centimeters of water per 100 grams of the hemihydrate.

3. The method of claim 1 in which the hemihydrate is a beta calcium sulfate hemihydrate having a normal consistency of about 60 to about 95 cubic centimeters of water per 100 grams of the hemihydrate.

4. The method of claim 1 in which the hemihydrate is an alpha calcium sulfate hemihydrate having a surface area of about 4,000 to about 5,000 square centimeters per gram.

5. The method of claim 1 in which the hemihydrate is a beta calcium sulfate hemihydrate, the particles thereof having a surface area of about 7,000 to about 16,000 square centimeters per gram.

6. The method of claim 1 in which the defoamer is tributyl phosphate and is present in an amount of about ½ to about 5 pounds per ton of hemihydrate.

7. A method of treating burning coal banks for extinguishing combustion comprising the steps of:
   (1) forming a sprayable composition consisting essentially of an aqueous slurry of calcium sulfate hemihydrate and a minor amount of defoamer, the hemihydrate particles having a surface area of about 4,000 to about 16,000 square centimeters per gram and having a normal consistency of about 30 to about 95, the water being present in an amount of about 25 to about 56% above normal consistency for that hemihydrate; and
   (2) applying said composition to the surface of the coal bank so as to form a dense, set, substantially air-impermeable and non-porous layer of gypsum at least on the order of about 1/16 to 1 inch in thickness on that surface of the coal bank.

8. The method of claim 7 in which the slurry is applied so as to form a set layer of about ¼ to about ⅜ inch thickness.

9. A method of treating combustible coal banks to inhibit spontaneous combustion therein comprising the steps of:
   (1) forming a sprayable composition consisting essentially of an aqueous slurry of calcium sulfate hemihydrate with a small amount of defoamer, the hemihydrate particles having a surface area of about 4000 to about 16,000 square centimeters per gram and having a normal consistency of about 34 to about 95 cubic centimeters of water per 100 grams of hemihydrate, the water being present in an amount of about 25 to about 56% above normal consistency for that hemihydrate; and
   (2) applying said composition to a portion of the combustible coal bank to form a dense, set, substantially air-impermeable and non-porous layer of gypsum at least on the order of 1/16 inch in thickness substantially excluding atmospheric air from the surface of the treated coal bank.

10. The method of claim 1 in which said slurry includes an amount up to about 33% by weight of the aqueous slurry of lime.

11. The method of claim 7 in which said slurry includes an amount up to about 33% by weight of the aqueous slurry of lime.

12. The method of claim 9 in which said slurry includes an amount up to about 33% by weight of the aqueous slurry of lime.